US008062012B2

(12) United States Patent  
Sabourin

(10) Patent No.: US 8,062,012 B2
(45) Date of Patent: Nov. 22, 2011

(54) ELASTOMERIC SEAL SIZER

(75) Inventor: Greg Sabourin, Spring Arbor, MI (US)

(73) Assignee: Metaldyne, LLC, Plymouth, MI (US)

( * ) Notice: Subject to any disclaimer, the term of this patent is extended or adjusted under 35 U.S.C. 154(b) by 0 days.

(21) Appl. No.: 12/156,781

(22) Filed: Jun. 4, 2008

(65) Prior Publication Data

US 2009/0041882 A1 Feb. 12, 2009

Related U.S. Application Data

(60) Provisional application No. 60/933,349, filed on Jun. 5, 2007.

(51) Int. Cl.
B29C 73/32 (2006.01)

(52) U.S. Cl. .......... 425/14; 425/393; 425/397; 425/403; 425/446

(58) Field of Classification Search ............. 425/11, 425/14, 389, 393, 397, 403, 446
See application file for complete search history.

(56) References Cited

U.S. PATENT DOCUMENTS

| | | | |
|---|---|---|---|
| 2,375,574 A | 5/1945 | Metheny et al. | |
| 2,683,924 A | 7/1954 | Schryver | |
| 3,420,928 A * | 1/1969 | Brown | 264/261 |
| 3,595,047 A * | 7/1971 | Fanning et al. | 72/58 |
| 3,999,930 A * | 12/1976 | Telbizoff | 425/394 |
| 4,043,727 A * | 8/1977 | Henzl | 425/578 |
| 4,075,755 A | 2/1978 | Bernatt et al. | |
| 4,320,568 A | 3/1982 | Herrod et al. | |
| 4,423,777 A * | 1/1984 | Mullins et al. | 166/120 |
| 4,437,517 A * | 3/1984 | Bianchi et al. | 166/120 |
| 4,610,834 A | 9/1986 | Baron et al. | |
| 4,723,430 A | 2/1988 | Hahn | |
| 5,201,207 A | 4/1993 | Organi et al. | |
| 5,490,407 A | 2/1996 | Doose | |
| 5,899,107 A | 5/1999 | Geimer et al. | |
| 5,931,851 A | 8/1999 | Morales | |
| 6,009,614 A | 1/2000 | Morales | |
| 6,406,282 B1 * | 6/2002 | Presti | 425/14 |
| 6,484,550 B2 | 11/2002 | Halasz et al. | |
| 2002/0047240 A1 * | 4/2002 | Radosav | 277/389 |
| 2004/0055480 A1 * | 3/2004 | Hellgren | 100/269.04 |
| 2004/0107754 A1 * | 6/2004 | Frenken | 72/62 |

* cited by examiner

Primary Examiner — Joseph Del Sole
Assistant Examiner — Ryan Ochylski
(74) Attorney, Agent, or Firm — McDonald Hopkins LLC

(57) ABSTRACT

An apparatus and a method for changing the shape of seals is provided. The apparatus includes an elastomer member that applies force onto the seal to change the size of the seal. An embodiment of the invention includes returning the seal to its original diameter by deforming the elastomer that is positioned about at least a portion of the seal.

10 Claims, 4 Drawing Sheets

ELASTOMERIC SEAL SIZER

CROSS-REFERENCE TO RELATED APPLICATIONS

This application claims priority from U.S. Provisional Patent Application No. 60/933,349 entitled "ELASTOMERIC SEAL SIZER," filed on Jun. 5, 2007, which is hereby incorporated by reference in its entirety.

FIELD OF THE INVENTION

The present invention generally relates to an apparatus and a method for changing the shape of objects, such as reducing the size of objects. More specifically, the present invention relates to an apparatus and a method for changing the shape and size of the seals, such as to their original size and shape.

BACKGROUND OF THE INVENTION

Seals, such as polytetrafluoroethylene (PTFE) seals, that are of a one-piece design having a continuous, unbroken, or cut section (similar to an o-ring) are commonly used for various sealing applications. Generally, the seals must be stretched over a mandrel or other similar device to properly position the seal into a groove on the outside diameter of the part to be sealed. Because of the physical properties of some materials, the seal stretches over time to a diameter greater than its original diameter. After stretching, the seal generally does not return to its original size. As a result, the seal is ineffective and is frequently discarded.

Prior art attempts to compress the seals to their original diameter have failed or at least have suffered from several deficiencies. For example, one common apparatus for returning seals to their original diameter utilizes a metal collet. As shown in FIGS. 1 and 2, a metal collet 5 is typically used to size seals. The metal collet 5 has segmented jaws spaced radially about the surface of the metal collet 5. Generally, force is applied to push the seal radially from the outside diameter inward to retract the seal to its original diameter. Essentially, the seal is "squeezed" to its original size and shape. However, these metal collets 5 are problematic for a number of reasons.

First, as shown in FIGS. 1-2, the metal collet 5 is typically made from a single continuous piece of spring-tempered steel. The metal collet 5 has relief cuts 6 (or kerfs) that permit steel sections 7 to move radially inward and outward with respect to the interior of the metal collet 5. Typically, the metal collet 5 is only designed to move a few thousandths of an inch. However, seals frequently expand more than a few thousandths of an inch from their original diameter. In such instances, the metal collet 5 is unable to return the seal to its original diameter. If the metal collet 5 is constructed so that it can expand further than a few thousandth of an inch, the metal collet 5 frequently fails due to material fatigue, which is not conducive to high volume manufacturing.

In addition, as the steel sections 7 move together, the kerfs 6 radially contract and are reduced from a gap of considerable size to a very narrow gap in order to squeeze the seals. However, the contraction of the kerfs 6 tends to pinch the seals resulting in damage and weakening of the seals. For example, the kerfs 6 compress the seal material between the gaps and frequently create witness lines and indentations along the seal that causes the seals to fail.

The metal collet 5 is a fixed geometry tool. In other words, the metal collet 5 has a fixed shape and is sized for one specific diameter. A fixed geometry tool, such as the metal collet 5, cannot accommodate the different compressability factors involved in sizing two or more differently sized seals. As a result, the metal collet 5 is not practical for sizing seals of varying diameters at the same time. The metal collet 5 is, instead, only designed to compress one type of seal and to compress the seal an amount equal to the range of movement of the metal collet 5.

Therefore, there is a need in the art for an improved apparatus and method for sizing seals. For example, there is a need in the art for an improved apparatus capable of sizing different sized seals with a single apparatus. In addition, there is a need in the art for an apparatus capable of sizing seals without risk of damage or weakening of the seals. There is also a need in the art for an apparatus for sizing seals that is capable of simultaneously sizing more than one type and sized seal.

Additional information will be set forth in the description which follows, and in part will be obvious from the description or may be learned by practice of the invention.

SUMMARY OF THE INVENTION

An apparatus and a method for changing the size and shape of a seal is provided. The apparatus utilizes an elastomer member to apply force on the seal and deform the seal to a different size. The method includes the step of positioning the elastomer member around a portion of the seal and applying force on the elastomer member to deform the seal. The seal may be connected to a fixture that has a size and shape corresponding to the desired size and shape of the seal.

DESCRIPTION OF THE DRAWINGS

Objects and advantages together with the operation of the invention may be better understood by reference to the following detailed description taken in connection with the following illustrations, wherein.

DETAILED DESCRIPTION

While the present invention is described with reference to the embodiments described herein, it should be clear that the present invention should not be limited to such embodiments. Therefore, the description of the embodiments herein is illustrative of the present invention and should not limit the scope of the invention as claimed.

Figure 1:
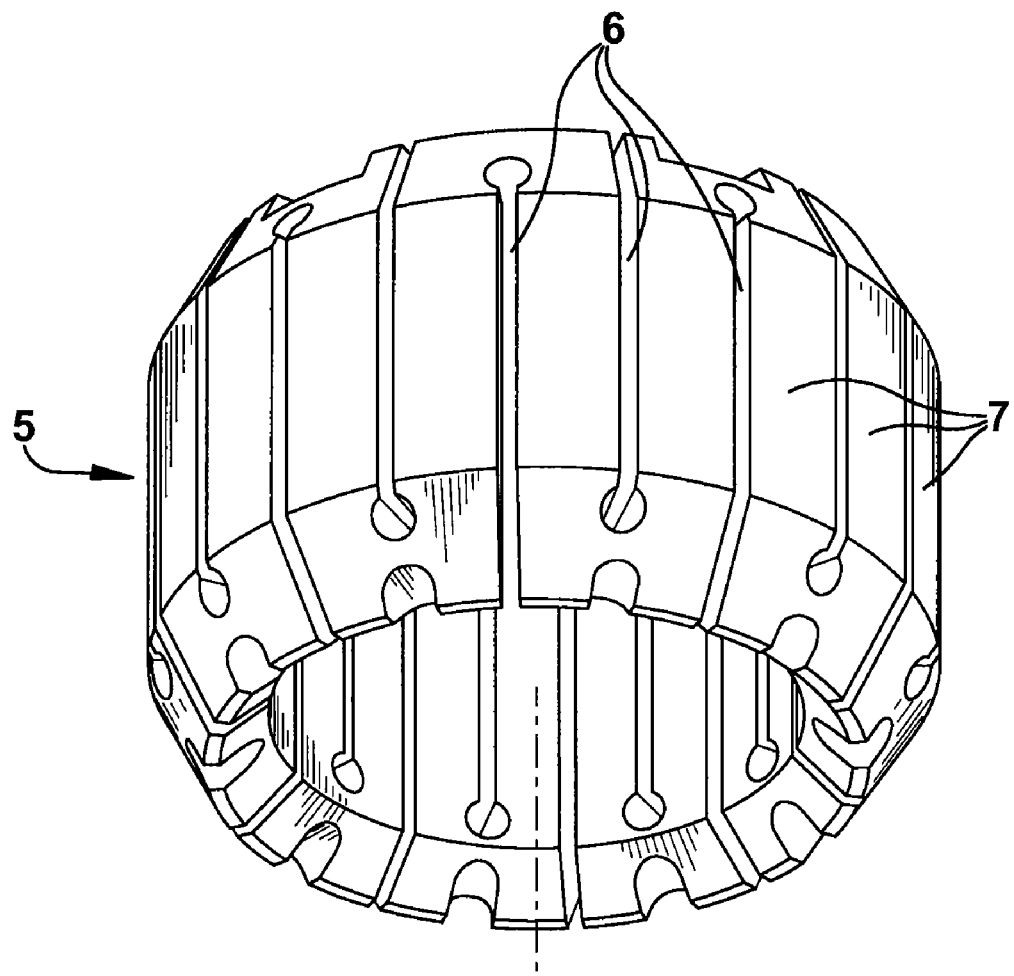
FIG. 1 illustrates a prior art metal collet.
Figure 2:
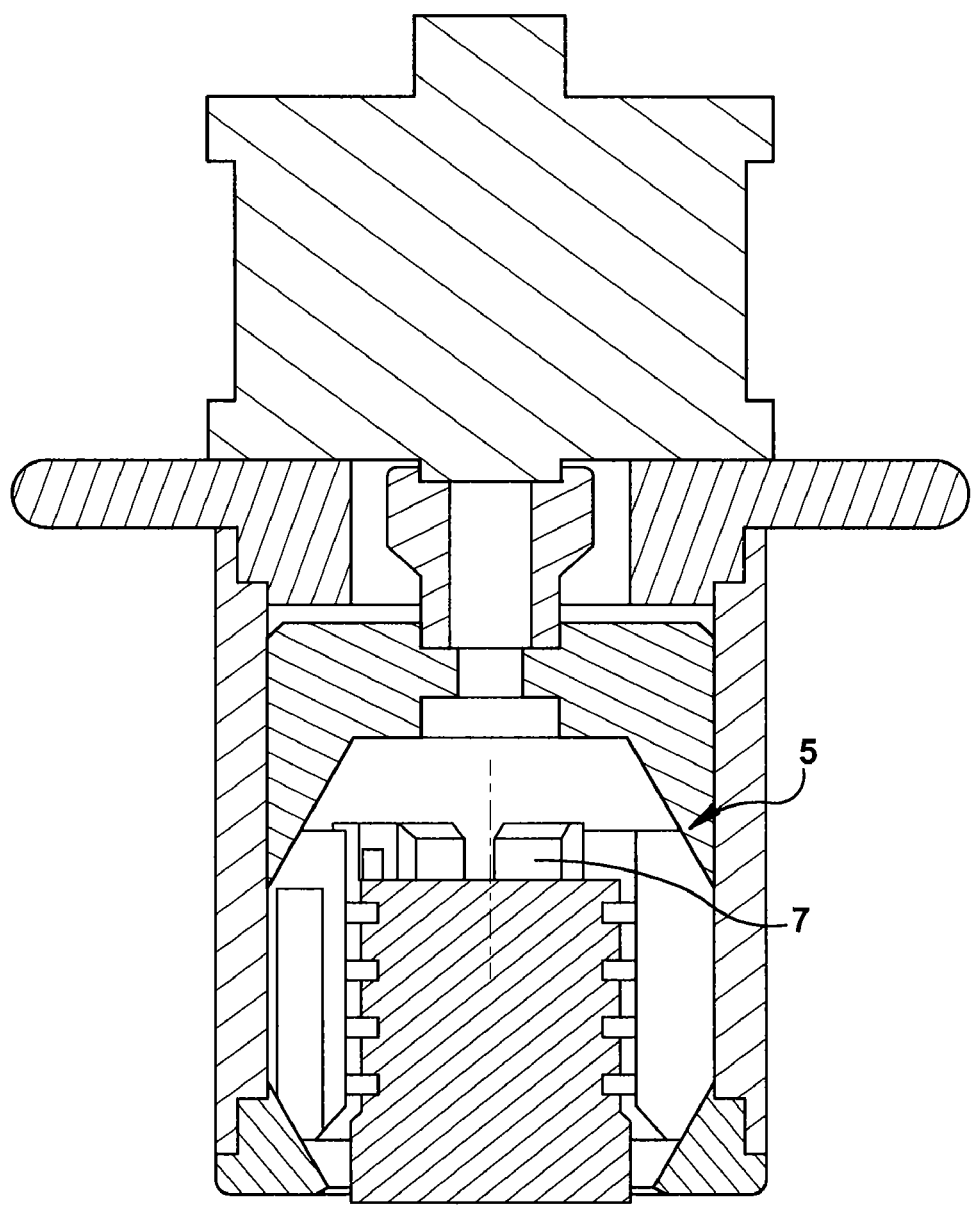
FIG. 2 is a cross-sectional view of a seal sizing assembly utilizing the metal collet of FIG. 1.
Figure 3:
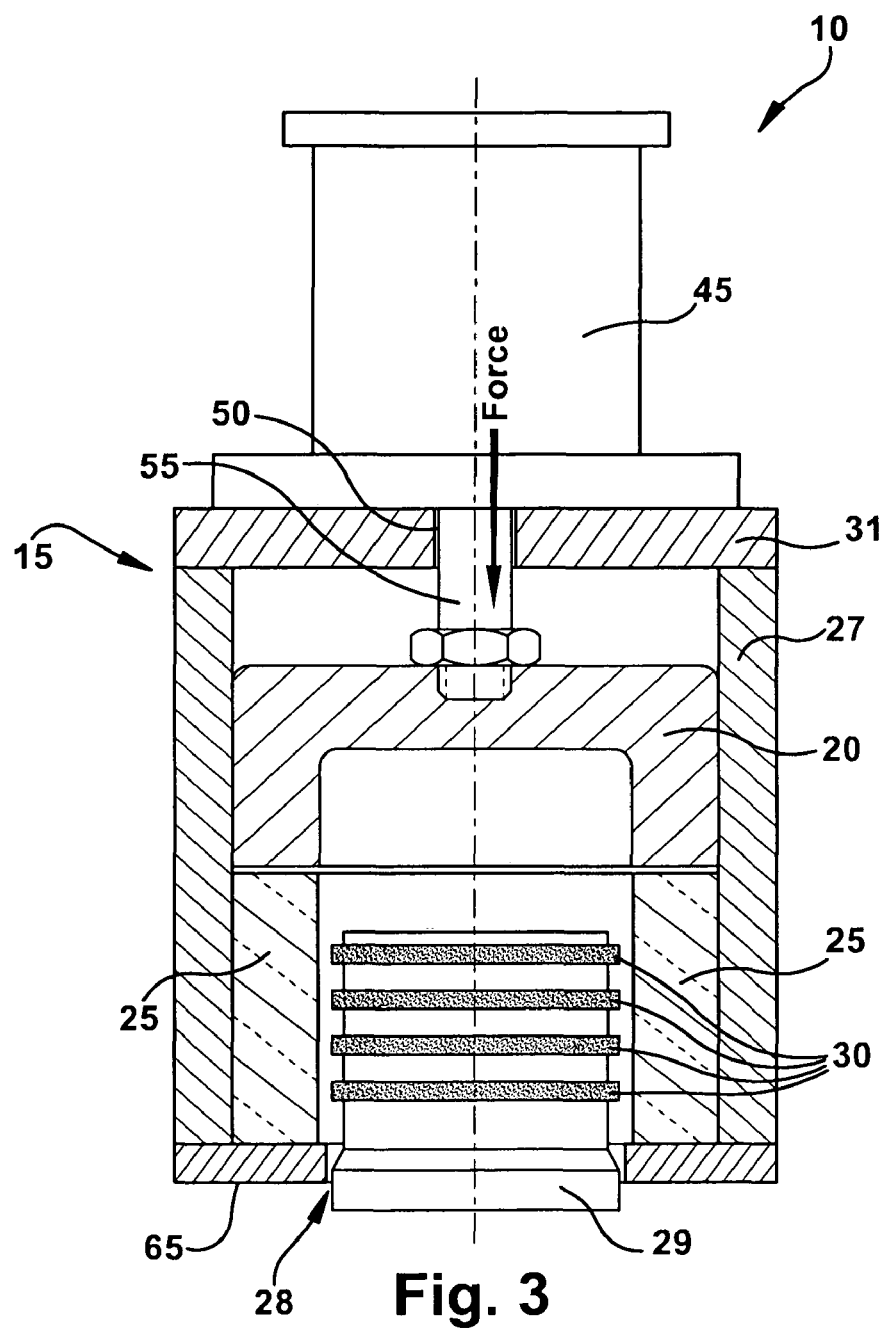
FIG. 3 is a cross-sectional view of a seal sizing assembly of the present invention in a retracted position.
Figure 4:
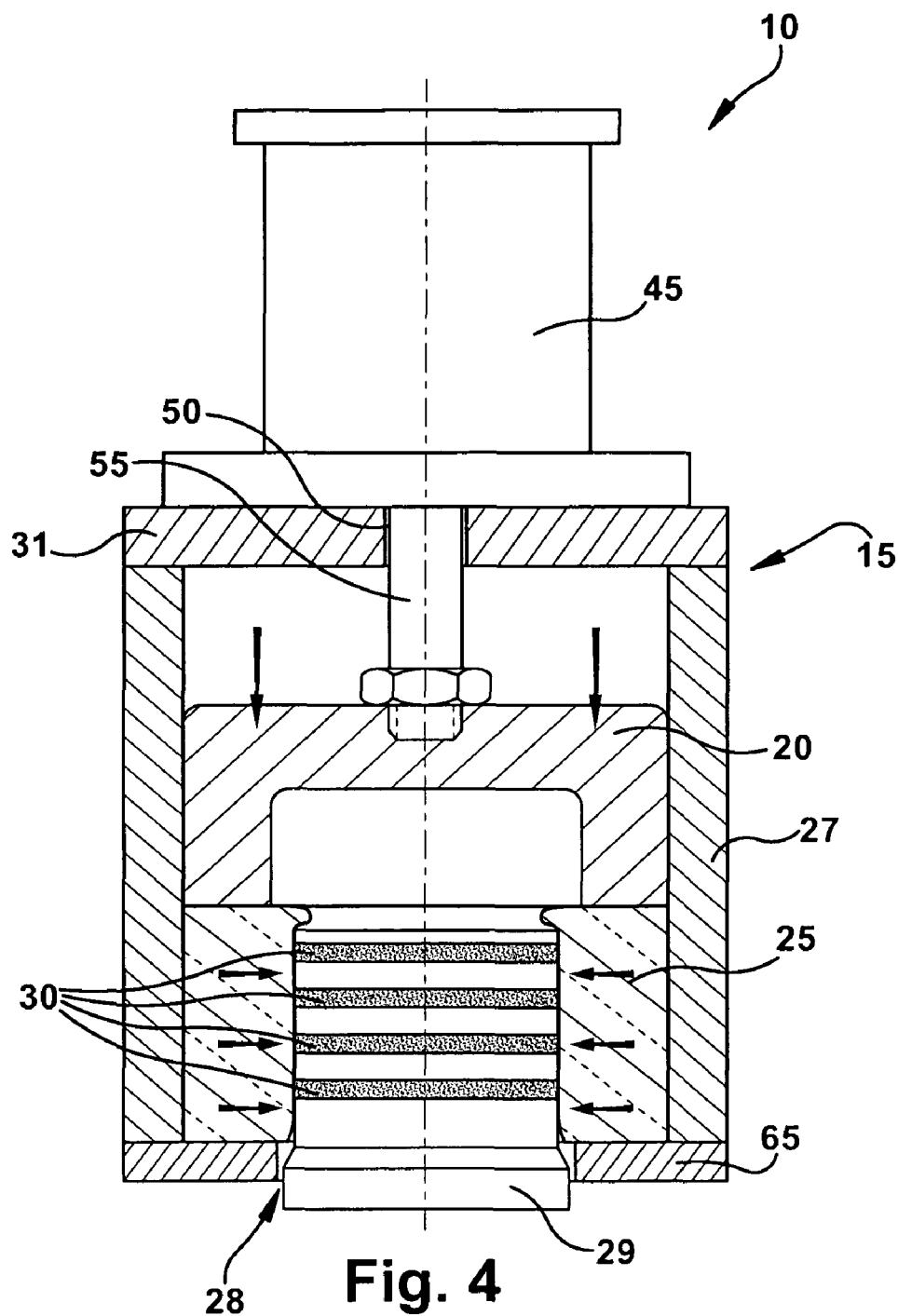
FIG. 4 is a cross-sectional view of a seal sizing assembly of the present invention in an extended position.

Referring now to the drawings, and in particular to FIGS. 3 and 4, a cross-sectional view of a seal sizing assembly 10 for sizing or otherwise deforming seals 30 is generally shown. The seal sizing assembly 10 may be used to alter or change the shape of the seals 30. During use or installation, for example, the seals 30 may permanently expand or stretch to diameters too lengthy to effectively perform their sealing function. As a result, without an apparatus and a method for returning the seals 30 to their original diameter or a diameter substantially similar to their original diameter, the seals 30 may be useless and, as a result, discarded. Accordingly, the seal sizing assembly 10 may be used to return the seals 30 to their original diameter, or at least reduce the diameter of the seals 30.

Additionally, the seal sizing assembly 10 may be used to change the shape of the seals 30 and the inner or outer contour of the seals 30.

The seals 30 may be any type of seals that may be susceptible to changing shape upon the exertion of force or pressure on the seals 30. For example, the seals 30 may be o-ring seals, ribbon seals, v-spring seals, angled seals, grooved seals, and combinations thereof. The seals 30 may be made of any material, such as polymers, minerals, graphite, and the like. In a preferred embodiment, the seals 30 are made of polytetrafluoroethylene ("PTFE") or contain PTFE, for example, virgin PTFE, graphite filled PTFE, polymer filled PTFE, glass filled PTFE, mineral-molly filled PTFE, or the like.

The seals 30 may be positioned on a fixture 29 that may be sized and shaped to correspond to a desired, predetermined size and shape of the seals 30. The seals 30 may be positioned around the fixture 29 and may abut the outer surface of the fixture 29. In a preferred embodiment, the fixture 29 is substantially similar in size and shape to the original size (or diameter) and shape of the seals 30. The fixture 29 may have grooves, indentations and/or distinct positions (not shown) for connecting each of the seals 30 about the fixture 29 and maintaining the position of the seals 30 on the fixture 29. In an embodiment, the fixture 29 may have multiple portions, each having a distinct size and shape. In such an embodiment, differently sized seals 30 may be simultaneously positioned on the fixture 29.

The fixture 29 is preferably insertable into a housing 15. For example, the housing 15 may have an opening 28 for insertion of the fixture 29 into the housing 15. In such an embodiment, the bottom end of the fixture 29 may have a size and shape substantially similar to the opening 28 of the housing 15. Accordingly, the fixture 29 may be secured within the housing 15 and maintained at a fixed position within the housing 15.

In an alternative embodiment, the fixture 29 may be permanently attached to the housing 15. In such an embodiment, the fixture 29 may not include the bottom portion that engages the housing 15 at the opening 28. Instead, a cap (not shown) having a size and shape similar to the opening 28 of the housing 15 may be removably attached to the housing 15 at the opening 28. The cap may be removable to insert the seals 30 and connect the seals 30 to the fixture 29.

The housing 15 is preferably made of a rigid material that is relatively resistant to deformation. For example, the housing 15 may be made of a durable and rigid material, such as metal, plastic, or the like. In an embodiment, an aperture 50 may be located at a first end 31 of the housing 15, and the opening 28 may be locate at a second end 65 of the housing 15. The opening 28 may provide access to the interior of the housing 15. As mentioned, the opening 28 at the second end 65 of the housing 15 may be substantially similar in size and shape to the bottom portion of the fixture 29 and/or the cap to prevent access to the opening 28, such as during use of the seal sizing assembly 10.

As shown in FIG. 3, the housing 15 generally has a sleeve 27 (or sidewalls) defining an interior of the housing 15. In a preferred embodiment, the sleeve 27 is constrained or at least substantially prevented from movement in the lateral, radial, and/or horizontal direction. For example, the first end 31 and the second end 65 of the housing 15 may be attached to or integrally formed with the sleeve 27 to prevent lateral, horizontal, and/or radial movement of the sleeve 27.

The aperture 50 in the housing 15 may correspond substantially in size and in shape to a piston 55. As shown in FIGS. 3-4, the piston 55 may be movable with respect to the housing 15. For example, the piston 55 may be longitudinally slidably into the housing 15, such as through the aperture 50. The piston 55 is movable between a retracted position, as shown in FIG. 3, and an extended position, as shown in FIG. 4. At the retracted position, the piston 55 may be a greater distance from the seals 30 than at the extended position.

The piston 55 may be connected to an actuator 45 or any type of device capable of moving the piston 55. In an embodiment. the actuator 45 is a linear actuator, such as a hydraulic, pneumatic, mechanical, or electrical actuator. The actuator 45 may be secured to the housing end cover 31. The actuator 45 and/or the piston 55 may be connected to and/or in communication with a processor or database to control movement of the piston 55 and/or the actuator 45. The processor or database may automate the movement of the actuator 45 and/or the piston 55 based on the identification of the seals 30, such as the size, shape and type of seals. In addition, the processor or the database may control the time in which the piston 55 is at the extended position or the retracted position in order to effectively size the seals 30.

A compressor 20 is connected to the piston 55. The compressor 20 is constructed of a rigid material such as metal, plastic, or the like. The compressor 20 is capable of translating force or pressure from the actuator 45 and/or the piston 55 to an elastomer member 25. The compressor 20 may be secured to one end of the piston 55, which may be opposite the actuator 45. In a preferred embodiment, the compressor 20 moves with the piston 55. However, the compressor 20 may be attached to the actuator 45 and/or the piston 55 in any manner known to one of ordinary skill in the art.

In a preferred embodiment, the compressor 20 is movable from a non-engaging position to an engaging position. FIG. 3 illustrates an embodiment of one of the non-engaging positions of the compressor 20. FIG. 4 illustrates an embodiment of one of the engaging positions of the compressor 20. In an embodiment, as best shown in FIG. 4, the compressor 20 may have a substantially cylindrical shape that is open at one end so as to provide clearance for positioning the fixture 29. It is understood, however, that compressor 20 may have any shape capable of engaging the elastomer member 25 in the extended position.

The compressor 20 and/or the piston 55 applies pressure and force onto the elastomer member 25. The elastomer member 25 is generally sized and shaped such that it engages the interior of the housing 15 and the exterior surface of the fixture 29. In an embodiment, the elastomer member 25 is shaped such that it engages the sleeve 27 of the housing 15 and the second end 65 of the housing 15. In an embodiment, the elastomer member 25 is tubular in shape and may be comprised of a single piece or, in some embodiments, multiple rings. As shown in FIGS. 3-4, the elastomer member 25 is positioned along the inner surface of the sleeve 27 so as to be coaxially aligned with opening 28. It is understood that the elastomer member 25 may be comprised of any elastomeric material, such as urethane, that is capable of maintaining uniform contact pressure on the seals 30 when compressed, as shown in FIG. 4.

The second end 65 of the housing 15 may engage one end of the elastomer member 25, as shown in FIGS. 3 and 4. As shown, the second end 65 may have a portion positioned along or about the perimeter of the opening 28 and adjacent the elastomer member 25 to retain the elastomer member 25 within the housing 15.

As the compressor 20 moves from the non-engaging position to the engaging position, the compressor 20 transfers force and pressure onto the elastomer member 25. The elastomer member 25 is constrained laterally, radially or horizontally away from the interior of the housing 15 by the sleeve 27.

The elastomer member 25 may be vertically restrained by the second end 65 of the housing 15, or by the cap (not shown). Accordingly, as force is applied onto the elastomer member 25, the elastomer member 25 deforms in the only unrestricted direction—radially inward toward the fixture 29 and the seals 30. In the embodiments of the invention shown in FIGS. 3 and 4, the compressor 20 applies force on the elastomer member 25 in a vertical direction, and the elastomer member 25 deforms in a substantially perpendicular direction—a horizontal direction. A person of ordinary skill in the art will appreciate that the seal sizing assembly 10 may instead be configured such that force is applied in a direction parallel to the direction in which the elastomer member 25 deforms.

The elastomer member 25 deforms and exerts pressure and force on the seals 30. The fixture 29 resists the force of the elastomer member 25 to cause the seals 30 to change shape and size. For example, the size and shape of the seals 30 may be changed to the size and the shape of the outer surface of the fixture 29. In a preferred embodiment, the size and the shape of the outer surface of the fixture 29 is substantially similar to the original size and shape of the seals 30. Therefore, the seal sizing assembly 10 may return the seals 30 to their original size and shape, for example the original diameter of the seals 30.

As best shown in FIG. 3, when the piston 55 is at the retracted position, the compressor 20 may be at the non-engaging position. In such a position, no force or pressure is applied to the elastomer member 25. Accordingly, the fixture 29 may be freely inserted into the housing 15, for example, through the opening 28. The actuator 45 may be activated to move the piston 55 from the retracted position to the extended position causing the compressor 20 to move correspondingly from the non-engaging position to the engaging position, as shown in FIG. 4. At the engaging position, the compressor 20 applies a force or pressure on the elastomer member 25, as shown in FIG. 4. The second end 65 of the housing 15 may function as a mechanical barrier to prevent the elastomer member 25 from extruding away from the compressor 20 when the piston 55 is at the extended position. Accordingly, the elastomer member 25 is effectively constrained in all opposing directions away from the seals 30 within a rigid cavity defined by the compressor 20, the sleeve 27, and the second end 65 of the housing 15.

As a result, as the elastomer member 25 changes shape, the only direction for the elastomer member 25 to extrude is radially inward toward the seals 30. Therefore, as the pressure on the elastomer member 25 increases, the clearance gap between the elastomer member 25 and the fixture 29 narrows such that the inner surface of the elastomer member 25 uniformly engages the outer surface of the seals 30 and/or the fixture 29. Accordingly, the seals 30 are deformed radially inward by the deformation of the elastomer member 25, thereby effectively sizing the seals 30, such as to substantially their original diameter. The seals 30 may have a substantially similar shape and size to the fixture 29 in which the seals 30 are attached.

In an embodiment, the elastomer member 25 is highly elastic so that the process is capable of a greater range of motion (as compared to steel collets) and much lower risk of material failure. As a result, the seal sizing assembly 10 has a lower risk of downtime and tool costs for repair of material failure. Another advantage of the present invention is that the elastic member 25 has no clearance gaps (kerfs), which eliminates the opportunity to pinch, indent or otherwise damage the seals 30. In addition, the seal sizing assembly 10 is capable of uniformly compressing multiple seals of different sizes simultaneously by extruding its material where needed to provide the required 'squeeze' to deform the seals 30. For example, the fixture 29 may have a first portion having a diameter greater than a second portion. The elastomer member 25 is capable of deforming a greater amount at the second portion that at the first portion. As a result, the differently sized seals 30 may be simultaneously sized to two different diameters. This presents an economical advantage, since a new tool does not need to be used for each differently sized seal. The elasticity of the elastomer member 25 may be tuned depending on the types and sizes of the seals 20 to be used in the seal sizing assembly 10.

Although the preferred embodiment of the present invention has been illustrated in the accompanying drawings and described in the foregoing detailed description, it is to be understood that the present invention is not to be limited to just the preferred embodiment disclosed, but that the invention described herein is capable of numerous rearrangements, modifications, and substitutions without departing from the scope of the claims hereafter.

Having thus described the invention, the following is claimed:

1. An apparatus for seal sizing comprising:
   a housing having rigid sidewalls;
   an elastomer member positioned within the interior of the housing;
   a fixture positioned within the housing;
   a polymeric seal positioned about said fixture;
   a compressor movable within the housing from an engaging position to a non-engaging position while the fixture remains stationary during the movement of the compressor, the compressor applying a force to deform the elastomer member so that a gap between the elastomer member and fixture is filled by the elastomer member to cause engagement between the elastomer and the seal.

2. The apparatus of claim 1 wherein the seal has an original diameter and further wherein the elastomer deforms to return the seal to the original diameter.

3. The apparatus of claim 1 further comprising:
   a piston attached to the compressor, the piston movable from an extended position to a refracted position, wherein the compressor engages the elastomer member when the piston is at the extended position and further wherein the elastomer is not deformed when the piston is at the refracted position.

4. The apparatus of claim 3 further comprising:
   a linear actuator connected to the piston, the linear actuator moving the piston from the extended position to the retracted position.

5. The apparatus of claim 1 wherein the fixture has a size and shape substantially similar to an original size and shape of the seal.

6. The apparatus of claim 1 wherein the seal deforms to a size and a shape substantially similar to a size and a shape of the fixture.

7. The apparatus of claim 1 wherein the fixture is substantially cylindrical.

8. The apparatus of claim 7 wherein the fixture has a first portion and a second portion and further wherein the diameter at the first portion is greater than the diameter at the second portion.

9. The apparatus of claim 8 further comprising:
   a first seal having an original diameter substantially similar to the first portion of the fixture;

a second seal having an original diameter substantially similar to the second portion of the fixture;

wherein the first seal engages the first portion of the fixture and the second seal engages the second portion of the fixture.

10. The apparatus of claim 9 wherein the elastomer simultaneously deforms to return the first seal to and the second seal to the original diameters of the first seal and the second seal, respectively.

* * * * *